July 15, 1952 — H. S. BECK — 2,603,394
SUPPORT
Filed Oct. 19, 1949 — 2 SHEETS—SHEET 1
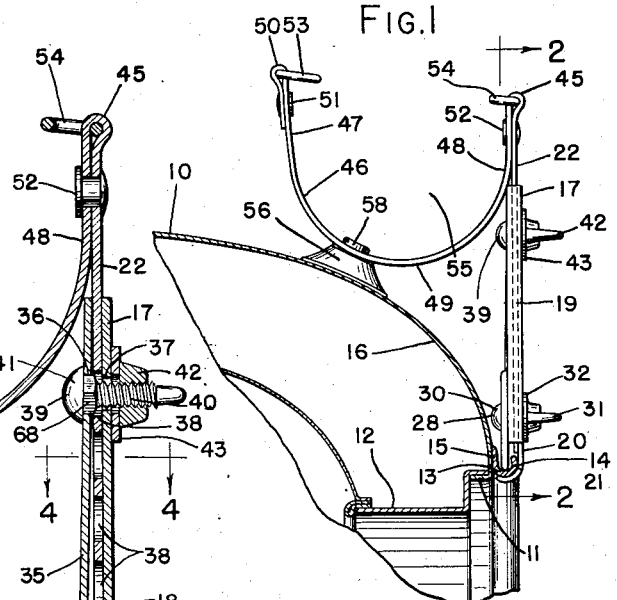
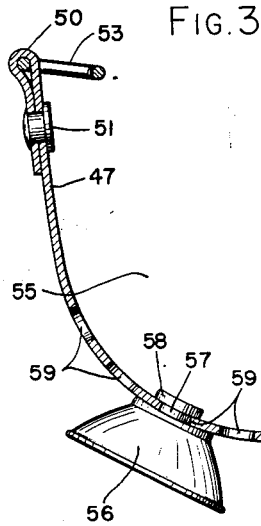
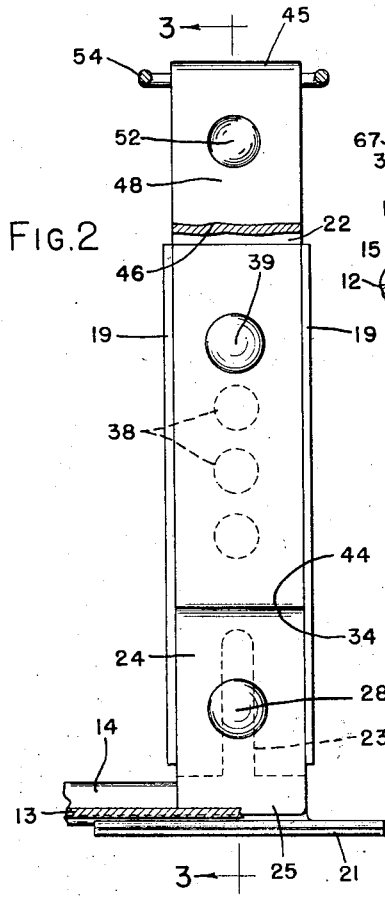
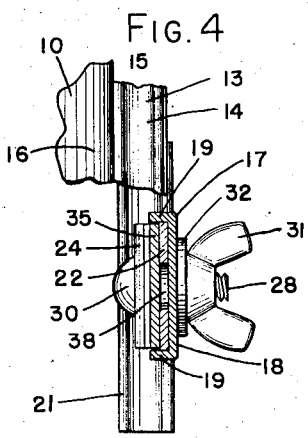
Inventor
HARRY S. BECK
By Canwell & Lagaard
ATTORNEYS

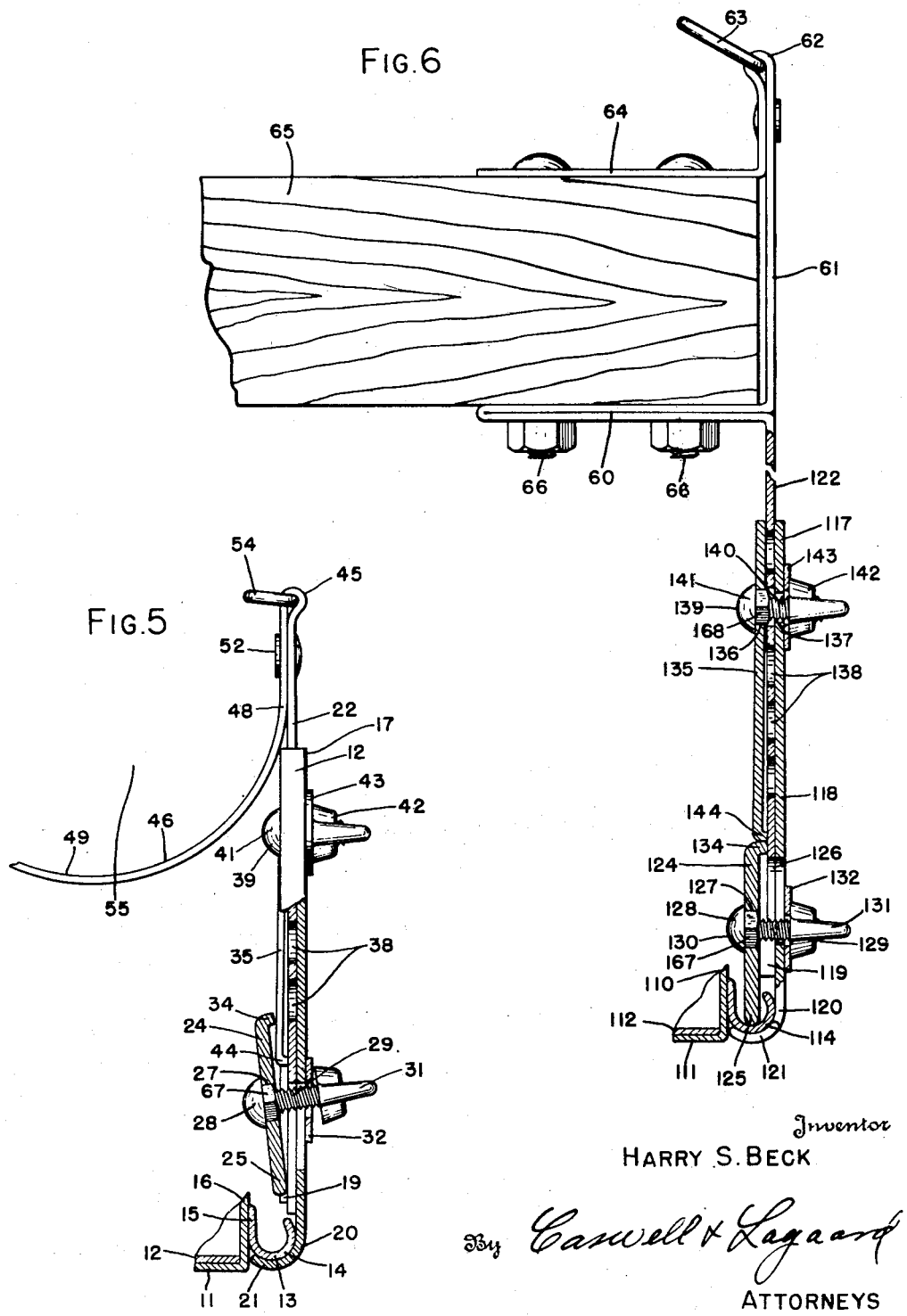

Patented July 15, 1952

2,603,394

UNITED STATES PATENT OFFICE 2,603,394

SUPPORT

Harry S. Beck, Minneapolis, Minn.

Application October 19, 1949, Serial No. 122,287

5 Claims. (Cl. 224—42.1)

The object of the instant invention resides in providing a support for use on automobiles constructed as hereinafter set forth and having the functions and advantages recited.

The support disclosed in this application is adapted to be used in conjunction with an automobile having a top and a gutter extending along the top. The instant invention comprises an arm formed with a hook at its lower end adapted to extend about the exterior of the gutter. Extending along the arm is a stem to which is attached a U-shaped bracket extending inwardly therefrom. In the gutter is disposed a clamp member which is adapted to engage the interior of the gutter and which is also adapted to engage the lower end of the said stem. A bolt extending through the clamp member stem and arm and slidable relative to the arm and stem, clamp the parts together and permits of moving the clamp member upwardly to disengage the same from the gutter. Overlying the upper portion of said stem is a plate-like keeper which has an abutment adapted to engage the upper end of the clamp member to hold the same in engagement with the gutter. A bolt passes through holes in the said keeper and arm and is adapted to pass through any of a number of holes in the stem whereby the stem may be adjusted relative to the arm. At the upper end of the stem is provided a U-shaped bracket having a suction cup attached to the same and adapted to be secured to the top of the automobile. Eyes connected to the upper ends of this bracket are used for attachment of a strap to the holder for holding the articles to be supported within the bracket.

In the drawings:

Fig. 1 is a cross sectional view of a portion of an automobile illustrating an embodiment of my invention applied thereto.

Fig. 2 is an elevational sectional view of the support and a portion of the automobile taken substantially on line 2—2 of Fig. 1 and drawn to a greater scale.

Fig. 3 is a longitudinal sectional view taken on line 3—3 of Fig. 2.

Fig. 4 is a cross sectional view taken on line 4—4 of Fig. 3.

Fig. 5 is a view similar to Fig. 3 showing the method of disengaging the clamp member from the gutter.

Fig. 6 is a view similar to Fig. 3 of a modification of the invention.

In the transporting of long articles such as fish poles and similar articles on an automobile various forms of racks and supports have been devised most of which are permanently attached to the automobile. With those that are detachable considerable time and inconvenience is involved in removing the same and frequently holes are left in the body of the automobile through which fastener members extend. The instant invention provides a construction which can be used in supporting poles or similar articles or which can be used to support a rack for luggage or other uses and which can be erected in short order and which when taken down occupies a minimum amount of space.

For the purpose of illustrating the invention a portion of the top 10 of an automobile has been shown in the drawings. This top has a depending portion 16 which curves downwardly as illustrated and which terminates in a flange 11 coacting with the door frame 12 of the automobile. The construction of the automobile forming no feature of the invention has not been shown in detail in the drawings, and it will readily be comprehended that the invention may be used with any type of automobile having a gutter over the doors or windows on the same. The automobile illustrated has attached to the top 10 a gutter 13 having a curved portion 14 with a flange 15 overlying the depending portion 16 of said top. The said flange may be secured thereto by welding, brazing or in any other well-known manner.

The invention proper includes an upwardly extending arm 17 constructed of sheet metal. This arm is bent to form a web 18 having flanges 19 along the vertical edges of the same. The flanges 19 terminate at their lower ends above the lower end 20 of the web 18 which end is bent to form a hook 21 adapted to hook about the exterior of the gutter 14 as best shown in Figs. 1 and 3. Mounted between the flanges 19 of the arm 17 and overlying the web 18 is an elongated stem 22 which is embraced by the flanges 19 and which may slide along the groove formed in said arm therebetween. The said stem extends well toward the lower end of the arm 17 and is formed at its lower end with a slot 23. Overlying the slotted end of the stem 22 is a clamp member 24 in the form of a plate which at its extreme lower end 25 is adapted to be received in the interior of the gutter 14. The web 18 of arm 17 has a slot 26 formed in the same and which is adapted to register with the slot 23 in stem 22. The clamp member 24 has a square hole 27 in the same which registers with the slots 23 and 26. A bolt 28 is employed for clamping the parts together. This bolt has a threaded shank 29 which extends through the hole 27 and the slots 23 and 26. The head 30 of said bolt engages the clamp member 24 while a square shoulder 67 on the shank 29 is received in the hole 27 and prevents rotation of the bolt. A wing nut 31 screwed on the shank 29 and engaging a washer 32 encircling said shank and bearing against the web 18 draws the parts together. The upper end of the clamp member 24 is formed with a projection 34 which is adapted to engage the stem 22. When the parts are clamped together by tightening the nut 31 the lower end of the stem 22 is held against the web 18 of arm 17 and the end 25 of said clamp member is urged against the inner surface of the gutter 14 to hold the support attached to the gutter.

Overlying the stem 22 at a locality above the clamp member 24 is a keeper 35. This keeper is constructed of sheet metal and is received between the two flanges 19 of arm 17 and held from rotation thereby. This keeper has a square hole 36 in the same and the web 18 of arm 17 has a circular hole 37 in it which is adapted to register with the hole 36. The stem 22 has a series of circular holes 38 in it and which are adapted to register with the holes 36 and 37. For holding these parts together a bolt 39 is employed. This bolt has a shank 40 which extends through the holes 36 and 37 and which is adapted to extend through any of the holes 38. Formed on the shank 40 is a square shoulder 68 which is received in the hole 36 and holds the bolt from rotation. The bolt 39 has a head 41 engaging the keeper 35. A wing nut 42 screwed on the shank 40 and engaging a washer 43 encircling said shank and bearing against the web 18 serves to draw the parts together. The lower end of the keeper 35 is formed with an abutment 44 adapted to engage the projection 34 on the upper end of the clamp member 24. This abutment serves to maintain the end 25 of the clamp member 24 within the gutter 14 and prevents disengagement of the said clamp member from the gutter.

The stem 22 is constructed of strip material which is bent to form a loop 45 at the upper end of the stem. Said material is further bent to form an inverted U-shaped bracket 46 having spaced vertically extending portions 47 and 48 with a connecting portion 49 therebetween. The extreme end of the portion 27 is constructed with another loop 50. The metal adjoining the loops 45 and 50 is held together by means of rivets 51 and 52. In the loops 45 and 50 are mounted eyes 53 and 54 through which a suitable strap, not shown in the drawings, may be run. The bracket 46 provides a space 55 within the same in which articles may be placed. When two of the supports are used, one at the forward end and one at the rearward end of the automobile, poles and other long articles may be stacked in the spaces 55 and held in position by the strap passing through the eyes 53 and 54.

In addition to supporting the support from the gutter 14 of the automobile a suction cup 56 is employed having a neck 57 and a head 58 formed thereon. Said neck is adapted to be received in any of a number of holes 59 in the portion 49 of the bracket 46. The suction cup 56 is constructed of rubber or some similar flexible material and is adapted to be attached to the top 10 of the automobile in the customary manner. When properly applied the said suction cup holds the holder in place with respect to the top of the automobile while the gutter 14 carries the weight of the holder and the load mounted therein.

The method of using the invention is as follows: The parts are arranged as shown in Fig. 5 with the nut 31 loosened. This permits of sliding the shank 29 of bolt 28 upwardly along the slot 26 until the end 25 of clamp member 24 clears the upper end of the gutter. The hook 21 is next hooked under the gutter 14 as shown in Fig. 5 and the bolt 28 slid downwardly until it occupies the position shown in Fig. 3. The shoulder 34 now drops beneath the abutment 44 and the said abutment holds the end 25 of said clamp member within the gutter 14. Upon tightening the nut 31 the parts become rigidly clamped together. If the stem 22 is not properly adjusted with respect to the top 10 of the automobile the bolt 39 is removed and the nut 31 loosened. The stem 22 may now be adjusted to the proper height and the bolt 39 reinserted into the holes 36 and 37 and into the particular hole 38 which comes closest to registering with the said holes. The nut 31 is again applied and said nut and the nut 42 are again tightened down and the suction cup attached to the top 10. The support is then ready for use. Upon removing the support it is merely necessary to loosen the nut 31, slide the clamp 24 upwardly as shown in Fig. 5 and to disengage the hook 21 from the gutter 14. Suction cup 56 is then disengaged and the support is free from the automobile.

In Fig. 6 I have shown a modification of the invention. Inasmuch as the construction of the major portion of the form of the invention shown in Fig. 6 is the same as that shown in Figs. 1 to 5, the description thereof will not be repeated but the same reference numerals preceded by the digit 1 will be used to designate the corresponding parts.

In this form of the invention the stem 122 is also constructed of strip material and is folded inwardly and back upon itself as indicated to form a bracket 60 extending inwardly from said stem. The material from which the stem 122 is constructed is further bent upwardly to form an upstanding extension 61 disposed in vertical alignment with the said stem. At the upper end of the said extension a loop 62 is formed which corresponds with the loop 45 of the other form of the invention and in which is mounted an eye 63. The end of the metal from which the stem 122 is constructed, is further bent inwardly to form another bracket 64 parallel with and spaced from the bracket 60. Between the brackets 60 and 64 is provided a bar 65 preferably of wood which is bolted to the brackets 60 and 64 by means of bolts 66. This bar extends completely across the top of the automobile and is secured at its other end to a similar support constructed in identically the same manner and mounted in the same manner as the support described. With such construction a trunk rack or other suitable structure may be mounted on the bars 65 and held supported thereon free from the top of the automobile.

The advantages of the invention are manifest. The support is extremely simple in construction. It can be fabricated at a nominal expense. The support is quickly mounted on the gutter of the car and when the U-shaped bracket is employed is additionally supported by engagement of the suction cup with the top of the automobile. When the supports are out of use the same may be readily stored in the trunk of the automobile and occupy a minimum amount of space. With my invention no alteration of the automobile is necessary to apply the supports to the same.

Changes in the specfic form of my invention, as herein described, may be made within the scope of what is claimed without departing from the spirit of my invention.

Having described my invention, what I claim as new and desire to protect by Letters Patent is:

1. In a support for attachment to an automobile having a gutter, an upwardly extending arm, a hook at the lower end of said arm adapted to extend about the lowermost portion of the gutter, a stem overlying said arm, a clamp member engageable at its lower end with the interior of said gutter and at its upper end with said stem, threaded means acting between said clamp member and arm and clamping said stem at its lower end to said arm and said arm to the gutter, a keeper overlying said stem at a locality above said clamp member and having an abutment engaging the upper end of said clamp member, threaded means engaging said keeper and arm and holding said stem against said arm and said abutment against said clamp member and attaching means at the upper end of said stem.

2. In a support for attachment to an automobile having a gutter, an upwardly extending arm, a hook at the lower end of said arm adapted to extend about the lowermost portion of the gutter, a stem overlying said arm, a clamp member engageable at its lower end with the interior of said gutter and at its upper end with said stem, said stem having a slot therein at its lower end, a bolt extending through said clamp member, the slot in said stem and through said arm, said stem at a locality above said slot having a series of holes therein, a keeper having a single hole therein and said arm having a corresponding hole, said holes being adapted to register with any of the holes in said stem, a bolt extending through the holes in said keeper and arm and adapted to extend through any of the holes in said stem, said keeper having an abutment adapted to engage said clamp member to hold said clamp member within said gutter and attaching means at the upper end of said stem.

3. In a support for attachment to an automobile having a gutter, an upwardly extending arm, a hook at the lower end of said arm adapted to extend about the lowermost portion of the gutter, a stem overlying said arm, a clamp member engageable at its lower end with the interior of said gutter and at its upper end with said stem, said clamp member having a hole therein, said stem having a slot therein and said arm having a slot therein, a bolt extending through the hole in said clamp member, the slot in said stem and the slot in said arm, said bolt when in the lower end of the slot in the arm positioning the lower end of said clamp member for engagement with the interior of the gutter and serving to draw said clamp member against the gutter and the lower end of said stem against said arm, a keeper overlying said arm at a locality above said clamp member said keeper having a hole therein, said stem having a series of holes therein and said arm having a hole therein, a second bolt extending through the holes in said keeper and arm and being adapted to extend through any of the holes in said stem and serving to clamp said stem against said arm, an abutment formed on the lower end of said keeper for engagement with said clamp member, said abutment holding the clamp member within the gutter and said first named bolt in the lower end of the slot in said arm, and attaching means at the upper end of said stem.

4. In a support for attachment to an automobile having a gutter, an upwardly extending arm, a hook at the lower end of said arm adapted to extend about the lowermost portion of the gutter, a stem overlying said arm, a clamp member engageable at its lower end with the interior of said gutter and at its upper end with said stem, said clamp member having a hole therein, said stem having a slot therein and said arm having a slot therein, a bolt extending through the hole in said clamp member, the slot in said stem and the slot in said arm, said bolt when in the lower end of the slot in the arm positioning the lower end of said clamp member for engagement with the interior of the gutter and serving to draw said clamp member against the gutter and the lower end of said stem against said arm, a keeper overlying said arm at a locality above said clamp member, said keeper having a hole therein, said stem having a series of holes therein and said arm having a hole therein, a second bolt extending through the holes in said keeper and arm and being adapted to extend through any of the holes in said stem and serving to clamp said stem against said arm, an abutment formed on the lower end of said keeper for engagement with said clamp member, said abutment holding the clamp member within the gutter and said first named bolt in the lower end of the slot in said arm, said abutment being narrow in the direction of extent of said bolt to clear the clamp member when the bolt is opened up to accommodate upward movement of the first named bolt in the slot in said arm and movement of the clamp member upwardly and out of the gutter, and attaching means at the upper end of said stem.

5. In a support for attachment to an automobile having a gutter, an upwardly extending arm, a hook at the lower end of said arm adapted to extend about the lowermost portion of the gutter, a stem overlying said arm, a clamp member engageable at its lower end with the interior of said gutter and at its upper end with said stem, threaded means acting between said clamp member and arm and clamping said stem at its lower end to said arm and said arm to the gutter, a keeper overlying said stem at a locality above said clamp member and having an abutment engaging the upper end of said clamp member, threaded means engaging said keeper and arm and holding said stem against said arm and said abutment against said clamp member, flanges issuing inwardly from said arm and embracing said stem, clamp member and keeper and attaching means at the upper end of said stem.

HARRY S. BECK.

REFERENCES CITED

The following references are of record in the file of this patent:

UNITED STATES PATENTS

| Number | Name | Date |
| --- | --- | --- |
| 1,733,007 | Dahl | Oct. 22, 1929 |
| 1,748,282 | Ellis | Feb. 25, 1930 |
| 1,798,872 | Ellis | Mar. 31, 1931 |
| 1,894,083 | Chaney | Jan. 10, 1933 |
| 2,288,442 | Felton | June 30, 1942 |
| 2,461,722 | Coons | Feb. 15, 1949 |
| 2,461,897 | Hopkins | Feb. 15, 1949 |
| 2,469,987 | Pilsner | May 10, 1949 |
| 2,514,266 | Walslager | July 4, 1950 |